UNITED STATES PATENT OFFICE.

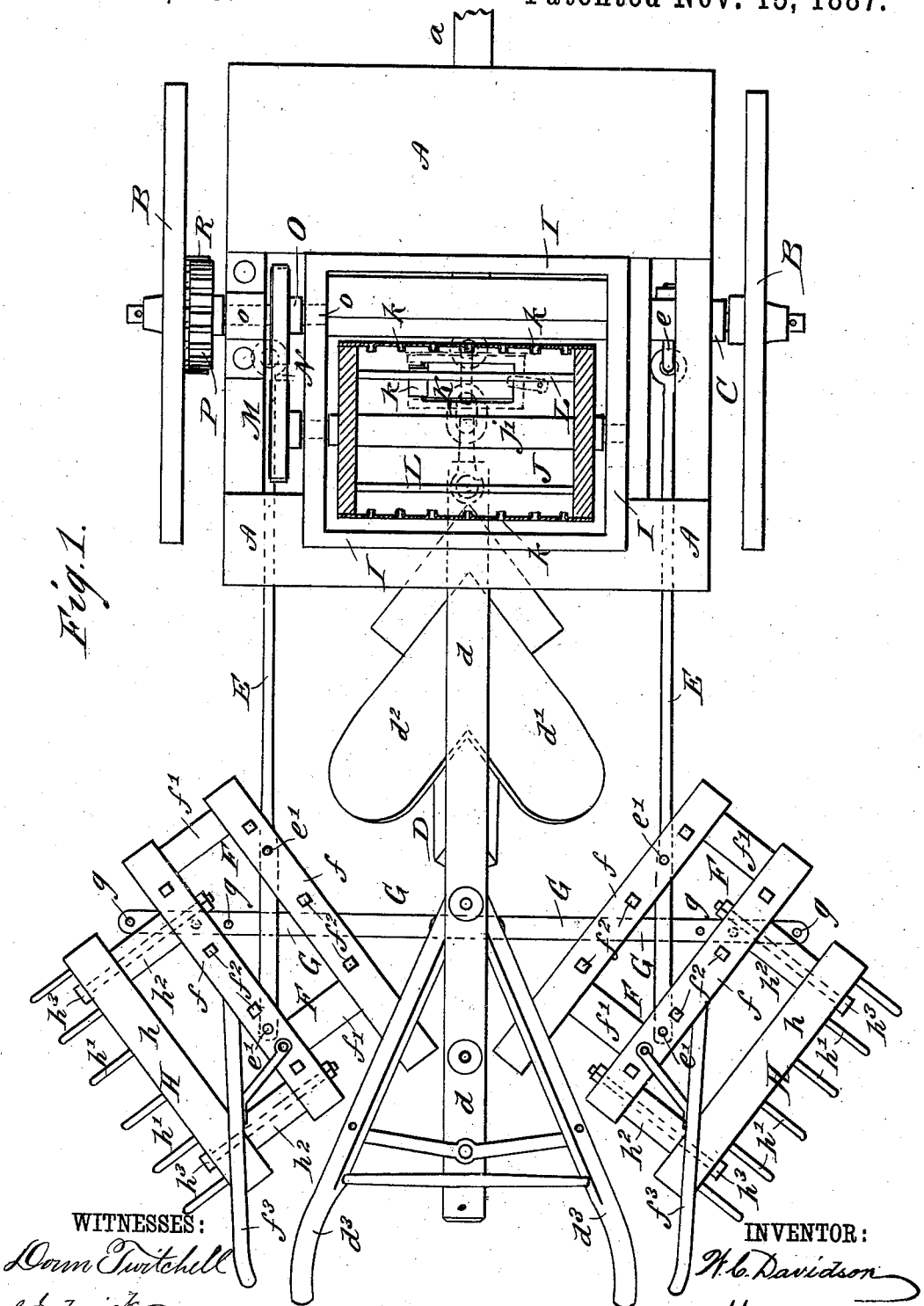

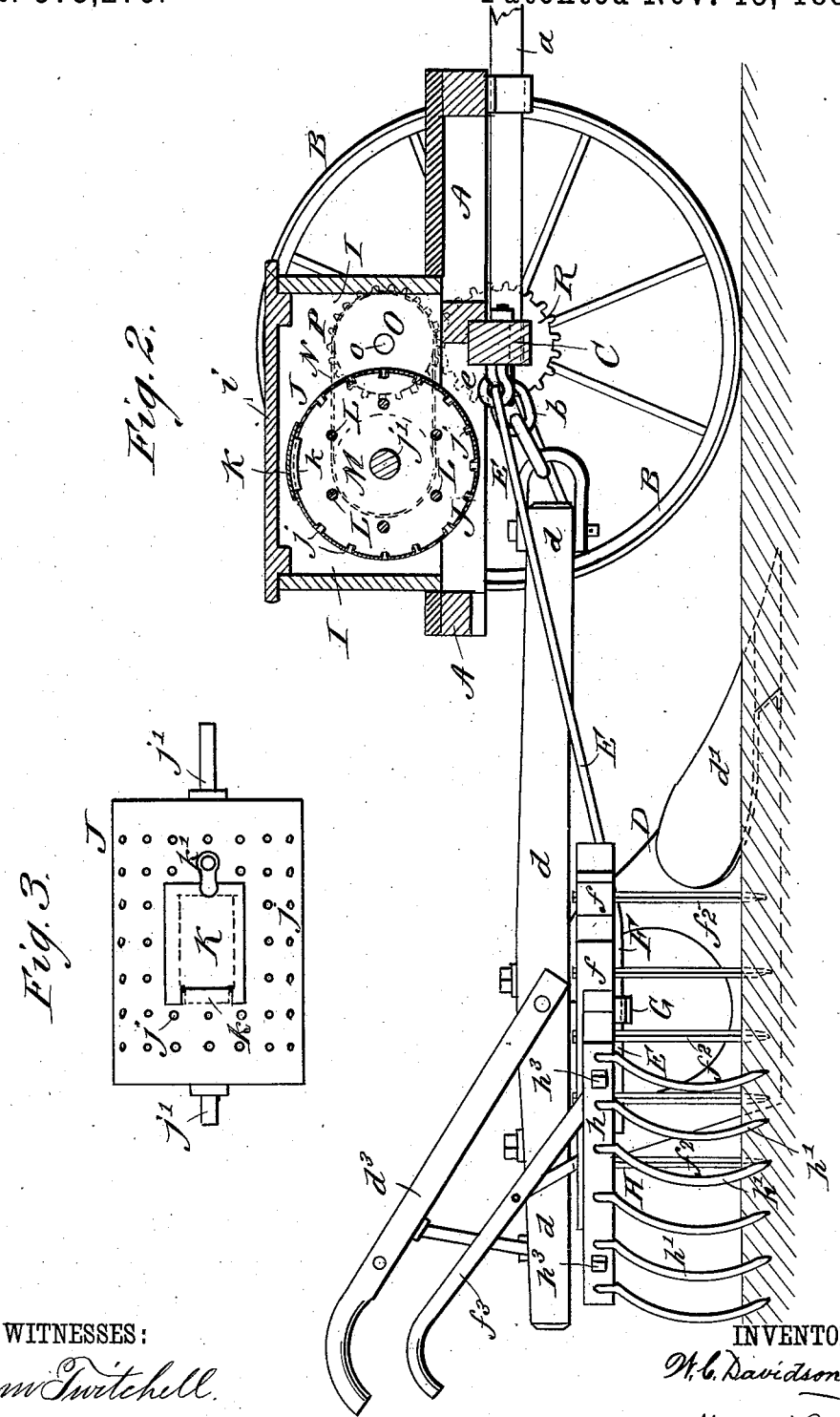

WILLIAM C. DAVIDSON, OF GRANDVILLE, MICHIGAN.

CULTIVATOR, DUSTER, AND DIGGER.

SPECIFICATION forming part of Letters Patent No. 373,275, dated November 15, 1887.

Application filed December 29, 1886. Serial No. 222,920. (No model.)

*To all whom it may concern:*

Be it known that I, WILLIAM C. DAVIDSON, of Grandville, in the county of Kent and State of Michigan, have invented a new and Improved Cultivator, Duster, and Digger, of which the following is a full, clear, and exact description.

My invention relates to a machine intended to prepare ground to receive crops and to cultivate the crops, and to dust poison over them to kill bugs and other plant-destroying insects, and to dig or harvest potatoes and other crops of like general character; and the invention has for its object to provide a simple and effective machine which may be operated for the purposes above stated by ordinary farm-hands, and will economize time and labor in planting, cultivating, and harvesting crops.

The invention consists in certain novel features of construction and combinations of parts of the machine, all as hereinafter fully described and claimed.

Reference is to be had to the accompanying drawings, forming a part of this specification, in which similar letters of reference indicate corresponding parts in all the figures.

Figure 1 is a plan view of my improved implement, showing the duster in horizontal section. Fig 2 is a side elevation with the sulky and duster in vertical section, and Fig. 3 is a plan view of the duster-drum.

The sulky of the machine comprises a frame or bed, A, mounted on wheels B B on the ends of an axle, C, and a tongue, $a$, provided for hitching the team to the machine.

The beam $d$ of a plow, D, having reversely-set or double mold-boards $d'$ $d^2$, is connected at its forward end to the sulky-axle C, and preferably by links $b$, engaging a clevis on the plow-beam. The plow has the usual handles, $d^3$, to be grasped in guiding it when at work.

In the sulky-axle C there are fastened a couple of eyebolts, $e\ e$, into which are hooked or secured the forward ends of two draft-bars, E E, to each of which a cultivator-harrow, F, is held, preferably by a fixed connection of the back ends of the draft-bars with the harrow-frames, which are provided with handles $f^3$, allowing an attendant to guide the harrows sidewise, and also to lift them bodily to clear the harrow-teeth of trash, or for passing over obstructions of any kind. The opposite harrows or cultivators F F are connected by a cross-bar, G, which has a series of holes, $g$, in its opposite ends, to receive connecting-pins, and allowing the harrows to be set nearer to or farther from each other, as the nature of the plants or crop to be cultivated may require. The connection of the two harrows by the bar G also assures easy lifting of them by the handles $f'$, for purposes above stated. The bar G crosses the plow D in a manner not to interfere with the free vertical movement of either the plow or harrows.

The harrows F F are made alike and as follows: The harrow-frame comprises two parallel bars, $ff$, placed apart by and fixed or framed to blocks $f'$ $f'$ and teeth $f^2$, of any approved form, fixed in the bars $f$. The opposite harrows are fixed at $e'$ $e'$ to their draft-bars E in a manner to hold the harrow-frame bars $ff$ in diagonal position, or so that the back ends of the harrows converge or approach each other, as most clearly shown in Fig. 1 of the drawings. This diagonal or converging arrangement of the opposite harrows not only facilitates the easy and effective action of their teeth in the soil, but also provides for the attachment of interchangeable forks or mold-boards at the backs of the harrows and disposed at like angle with the harrow-frame bars, as next described with reference to potato-gathering forks H. (Shown in the drawings.)

The forks H comprise a head-bar, $h$, and a series of teeth, $h'$, preferably having the bowed or bent form shown clearly in Fig. 2, and fixed to the head-bar, which bar is held to the outside or rear harrow-frame bar $f$ by bolts $h^3$, which pass through the bars $f$ $h$, and also through spacing-blocks $h^2$, which hold the fork H a suitable distance from the harrow-teeth to allow effective action of both the harrow and fork teeth. With this construction it is obvious that the fork H may be removed from the harrow at any time, to allow a head-piece or beam carrying a suitable mold-board or scraper to be attached to the rear harrow-frame bar $f$ by the same bolts, $h^3$, used to fasten the fork.

It will be noticed that the fork-teeth $h'$ stand in a line ranging diagonally with the line of draft of the machine; hence the opposite forks H H will operate to carry substances toward their inner ends or directly behind the plow—potatoes, for instance, which have been dug or turned up by the plow.

On the sulky-frame A a box, I, is fitted, and in the opposite side walls of the box is journaled, by its shaft $j'$, a cylinder or drum, J, the periphery of which is made from a sheet-metal plate, and is provided with a series of perforations, $j$, produced by punching the metal of the plate from the outside face, thereby producing a series of jagged necks around the perforation, at the inside of the drum, which operate to break up or disintegrate poisonous powders or substances placed in the drum, to be distributed or dusted thereby over growing potatoes or other crops, to kill bugs, worms, or other plant-destroying insects. The drum J has a side opening allowing the insecticide to be placed in it, and a door or lid, K, is provided to close said opening. The lid is shown with a tongue, $k$, at one end, entering the opening and underlapping the periphery of the drum, while its other marginal portions overlap the outside of the drum around the opening, and a button, $k'$, is provided to hold the lid closed. If preferred, the lid may be hinged or otherwise fastened to the periphery of the drum. A series of rods, L, fixed in the end walls of the drum and running lengthwise of it, or parallel with the drum-shaft, also operate to break up the poison powder or other insecticide placed in the drum.

When the poison is to be scattered or dusted upon plants set in drills or a continuous line, the holes in the drum-periphery may have any preferred close arrangement; but for dusting poison onto plants set in hills or spaced apart the holes in the drum will be made farther apart to drop the poison only onto the plants and not waste it on the ground between the plants. This may be accomplished by substituting one drum J for another having holes differently arranged, or by closing up more or less of the holes in the periphery of the drum in any approved way. The box I has a lid, $i$, which is removed in Fig. 1 of the drawings, but when applied forms a seat for the driver or attendant, as will be understood from Fig. 2.

The shaft $j'$ of the duster-drum J has fixed to it a pulley, M, over which a belt, N, runs to a pulley, O, fixed to a short shaft, $o$, which is journaled in the box I and in a bearing on the sulky-frame, and this shaft $o$ also has fixed to it a gear-wheel, P, which meshes with a gear-wheel, R, fixed to the sulky-axle, C, and whereby the drum J will be rotated by the advance of the machine.

The operation is as follows: To prepare ground to receive celery or to cultivate this and other vegetable crops, the forks H will be removed from the harrows by taking out the bolts $h^3$, and the belt N will be unshipped to prevent rotation of the drum J, and as the machine is drawn forward the plow D will open or deepen a ditch or furrow between hills or beds, and the harrows F will break up the earth or freshen it at the sides of the beds or hills. For some crops scrapers or side plow-blades may be fixed to the rear bars $f$ of the harrow-frames, to heap up or pack the earth at each side of the furrow cut by the plow.

In using the implement simply for dusting poison onto growing plants, the plow and harrows will be removed, and the belt N will be adjusted to the pulleys M O, and as the machine advances the drum now charged with the insecticide will dust it onto the plant. To cultivate the plants at the same time the poison is dusted on them, it is only necessary to attach the harrows to allow their operation at each side of the plants.

For digging potatoes, turnips, and other crops of like general nature, the plow D will be connected to the sulky, and the belt N, will be unshipped from the drum-driving pulleys, and the forks H will be connected to the harrows, and as the machine moves forward the plow will dig the potatoes and throw them with the earth to either side, and the harrows will follow and separate the earth and potatoes, and the forks H will then gather the potatoes in a row directly behind the plow, whence they may be picked up to be packed for market.

With the herein-described implement a great saving of labor may be effected in preparing the soil to receive various crops and in destroying insects on or around the growing plants and in the harvesting of the crops, as will readily be understood.

Having thus fully described my invention, what I claim as new and desire to secure by Letters Patent, is—

1. The combination, with a sulky, as A B C, of a plow, D, and two harrows, as F F, connected to the sulky, one at each side of and behind the plow, and said harrows set obliquely to the line of draft of the machine, substantially as shown and described.

2. The combination, with a sulky, as A B C, of a plow, D, two harrows, F F, connected to the sulky, one at each side of the plow, and converging forks H H, held to the harrows and ranging obliquely to the line of draft of the machine, substantially as shown and described.

3. The combination, with a sulky, as A B C, of a plow, D, two harrows, F F, connected to the sulky, one at each side of the plow and set obliquely to the line of draft of the machine, and converging forks H H, held to the harrow, and also ranging obliquely to the line of draft of the machine, substantially as shown and described.

4. The combined harrow and fork F H, formed of a toothed frame provided with harrow-teeth, a head-piece, $h$, having tines $h'$, spacing-blocks $h^2$ between the harrow-frame and head-piece, and bolts $h^3$, uniting said parts, substantially as shown and described, whereby the fork may be detached from the harrow and scrapers, or other devices may be attached thereto by the same bolts, as and for the purposes set forth.

5. The combination, with a sulky, as A B C, of a plow, D, two independent harrows, F F, provided with handles $f^3$ and connected to the sulky, one at each side of the plow, and said harrows set obliquely to the line of draft of the machine, and a tie-bar, G, connecting the harrows, substantially as described, for the purposes set forth.

WILLIAM C. DAVIDSON.

Witnesses:
O. L. DAVIDSON,
LEONARD COULL.